(12) United States Patent  
Otting et al.

(10) Patent No.: US 11,993,044 B2
(45) Date of Patent: May 28, 2024

(54) METHOD AND APPARATUS FOR IMPROVED TREAD SPLICING

(71) Applicant: BRIDGESTONE BANDAG, LLC, Muscatine, IA (US)

(72) Inventors: Robert G. Otting, Muscatine, IA (US); Terry A. Westaway, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

(21) Appl. No.: 17/038,346

(22) Filed: Sep. 30, 2020

(65) Prior Publication Data

US 2021/0008822 A1   Jan. 14, 2021

Related U.S. Application Data

(62) Division of application No. 15/163,815, filed on May 25, 2016, now Pat. No. 10,821,693.

(Continued)

(51) Int. Cl.
*B29D 30/52* (2006.01)
*B29D 30/56* (2006.01)
(Continued)

(52) U.S. Cl.
CPC ............ *B29D 30/52* (2013.01); *B29D 30/56* (2013.01); *B29D 30/0601* (2013.01);
(Continued)

(58) Field of Classification Search
CPC ............ B29D 30/0601; B29D 30/0605; B29D 30/0606; B29D 30/0607; B29D 30/0609; B29D 30/065; B29D 30/0651; B29D 30/0653; B29D 30/52; B29D 30/56; B29D 2030/0613; B29D 2030/0616; B29D 30/54; B29D 30/68; B29D 2030/0606;

(Continued)

(56) References Cited

U.S. PATENT DOCUMENTS 5,120,209 A   6/1992   MacMillan
5,769,990 A   6/1998   Hoffmeister
(Continued)

FOREIGN PATENT DOCUMENTS

EP   0 579 436 A1   1/1994
EP   1 486 310       12/2004
(Continued)

OTHER PUBLICATIONS

Okabe H, JP-2005161923-A, machine translation. (Year: 2005).*
(Continued)

*Primary Examiner* — Sedef E Paquette (57) ABSTRACT

A mold for molding a tire tread comprises a plurality of mold segments. Each of the plurality of mold segments includes an integer number of tread pitch repetitions. The plurality of mold segments are structured to be coupled to each other end-to-end so as to form the mold such that the mold includes an integer number of tread pitches. The mold also includes at least one mold end segment positioned on at least one end of the mold and has a mold end segment length shorter than a length of each of the plurality of mold segments.

9 Claims, 9 Drawing Sheets

Related U.S. Application Data (60) Provisional application No. 62/166,286, filed on May 26, 2015.

(51) Int. Cl.
    *B29D 30/06*    (2006.01)
    *B60C 11/03*    (2006.01)

(52) U.S. Cl.
    CPC .. *B29D 30/0606* (2013.01); *B29D 2030/0607* (2013.01); *B29D 2030/0609* (2013.01); *B29D 2030/0651* (2013.01); *B29D 2030/0653* (2013.01); *B60C 11/0318* (2013.01)

(58) Field of Classification Search
    CPC .... B29D 2030/0607; B29D 2030/0609; B29D 2030/0612; B29D 2030/0651; B60C 11/0318; B60C 2011/0325; B29C 33/00; B29C 33/424; Y10T 156/1066
    USPC .................................... 156/110.1; 152/209.2
    See application file for complete search history.

(56) References Cited

U.S. PATENT DOCUMENTS

| | | |
|---|---|---|
| 6,426,482 B1 | 7/2002 | Fike |
| 2004/0062898 A1 | 4/2004 | Felegi et al. |
| 2006/0269636 A1 | 11/2006 | Miyamae |
| 2007/0163691 A1 | 7/2007 | Cuny et al. |
| 2008/0099114 A1 | 5/2008 | Ohara |
| 2010/0027251 A1 | 2/2010 | Shpizel |
| 2011/0037447 A1 | 2/2011 | Mair |
| 2011/0186198 A1 | 8/2011 | Cerny |
| 2013/0106022 A1 | 5/2013 | Gridley et al. |

FOREIGN PATENT DOCUMENTS

| | | | |
|---|---|---|---|
| JP | H08-300512 | | 11/1996 |
| JP | 2001-354008 A | | 12/2001 |
| JP | 2005161923 A | * | 6/2005 |
| WO | WO-2007/018928 A2 | | 2/2007 |
| WO | WO-2010/027251 A2 | | 3/2010 |

OTHER PUBLICATIONS

Non-Final Office Action for U.S. Appl. No. 15/163,815, dated Jan. 31, 2020.

Non-Final Office Action for U.S. Appl. No. 15/163,815, dated Nov. 14, 2018.

Supplementary European Search Report for European Patent Application No. EP16800646 conducted by Christoph Vetter dated Dec. 10, 2018, Munich, Germany.

The International Search Report and the Written Opinion of the International Searching Authority issued in PCT/US2016/033996, dated Aug. 23, 2016.

U.S. Notice of Allowance for U.S. Appl. No. 15/163,815, dated Jul. 14, 2020.

* cited by examiner

MCPHIE AND APPARATUS FOR
METHOD AND APPARATUS FOR IMPROVED TREAD SPLICING

CROSS REFERENCE TO RELATED APPLICATIONS

This application is a divisional application of U.S. patent application Ser. No. 15/163,815, filed May 25, 2016 and entitled "Method and Apparatus for Improved Tread Splicing", which claims to priority to U.S. Provisional Patent Application No. 62/166,286, filed May 26, 2015 and entitled "Method and Apparatus for Improved Tread Splicing", the contents of each of which are incorporated herein by reference.

FIELD

Some embodiments described herein relate generally to apparatus and method of splicing a plurality of tire treads.

BACKGROUND

Retreaded tires provide an economical way to gain additional use from tire casings after the original tread or retread has become worn. According to some methods of retreading, sometimes referred to as cold process retreading, worn tire tread on a used tire is removed to create a buffed, generally smooth treadless surface about the circumference of the tire casing to which a new layer of tread may be bonded.

The tire casing may be inspected for injuries, some of which may be skived and filled with a repair gum while others may be severe enough to warrant rejection of the casing. After completion of the skiving process, the buffed surface may be sprayed with a tire cement that provides a tacky surface for application of bonding material and new tread. Next, a layer of cushion gum may be applied to the back, i.e., the inside surface of a new layer of tread, or alternatively, the layer of cushion gum may be applied directly to the tacky surface on the tire casing. Conventionally, the cushion gum is a layer of uncured rubber material. The cushion gum and tread may be applied in combination about the circumference of the tire casing to create a retreaded tire assembly for curing. Alternatively, a length of tire tread may be wrapped around the tire casing with the cushion gum already applied. The cushion gum may form the bond between the tread and the tire casing during curing.

Following assembly of the tire casing, cement, cushion gum and tread, the overall retreaded tire assembly may be placed within a flexible rubber envelope. An airtight seal may be created between the envelope and the bead of the tire. The entire envelope tire assembly may be placed within a curing chamber and subjected to a vulcanization process that binds the materials together.

Portions of the above-described method of cold process retreading may be accomplished on a tire builder. Tire builders may include spindles on which a tire and a roll of cushion gum may be mounted. In such tire builders, the cushion gum may be dispensed by hand as the tire is rotated to adhere the cushion gum to the tire casing. After the cushion gum has been applied, the circumference of the tire casing with cushion gum may be measured and an applicable length of tread may be cut.

In such tire building systems, a length of tread may be applied to the cushion gum and casing. Variability in the cut length of the tire tread may demand manipulation of the tread segment around the perimeter of the tire casing and cushion gum to create an appropriately located splice in which both ends of the tread length abut one another. It is often desirable, for aesthetic and performance purposes, to match the tire tread design at each end of the tire tread length so that where the two ends of the tire tread length match at the splice, the repetitive pattern of the tire tread design is substantially continuous. The complication and difficulty of such procedures may be increased because the tread patterns are subject to varying characteristics depending on the cut location. For instance, from a cross-sectional perspective, the tread end surfaces may have varying total surface area quotients, varying amounts of surface area farther from the center of rotation of the tire and closer to the contact surfaces, etc. In the bonding process, such parameters of the multi-dimensional profile of the tread splice may provide for improved operation in the vulcanization process, particularly in relation to use of envelopes and pressure.

Various devices and methods for cutting a tread length to an appropriate size and location have been proposed in the past. For example, U.S. Pat. No. 6,899,778 (the '778 patent), the contents of which are incorporated herein in their entirety by reference, generally describes a tire builder. The machine may include a rotatable hub for mounting of a buffed tire casing and a cushion gum applicator that may be configured to stretch a length of cushion gum onto a tire casing. A tread dispenser may automatically dispense a length of tire tread based on the circumference of the tire casing or the circumference of the tire casing plus the cushion gum. Thereafter, a tread applicator of the machine may manipulate the length of tire tread onto the cushion gum to accommodate variability in measurements, cutting, etc.

Machines such as described in the '778 patent may rely on semi-automatic or automatic processes when determining what length of tread is appropriate for a particular casing. Such processes may include measurements providing information indicative of the circumference of the casing as well as the length of tread that is dispensed from a roll. When an approximate length of tread has been dispensed to match the measured circumference of the casing, a manual cutting operation may be employed to sever a length of tread.

Variability in the measurements of the circumference of the casing or of the dispensed length of tread may result in dimensional variations when cutting the length of tread. Manual intervention in the cutting process of the length of tread to provide a substantially uninterrupted tread pattern around the entire periphery of the retreaded tire may be inaccurate as well as compound the dimensional variability in determining the appropriate length of tread that is required. Such intervention may often fail to account for the characteristics of the cross-sectional tread and improving the characteristics of the abutting ends of the tread for performance and bonding characteristics. The inaccuracy of the manual cutting operation in matching the tread pattern may adversely affect the service life and aesthetic appeal of the final retreaded tire. In certain instances, the compounded variability in cutting the appropriate length of tread may make the length of tread unsuitable for use on a retreaded tire, thus necessitating the cutting of an additional length. Such rework operations are time consuming, increase the cost of the retreading operation, increase waste, and so forth.

BRIEF SUMMARY

Some embodiments relate to methods and apparatuses for making retreaded tires and, more particularly, to apparatuses and methods in which a leading edge or trailing edge of a roll of preformed treads may be cut at a location relative to the tread pattern to provide for improved splicing while providing a durable splice across varying retreading conditions and reducing scrap in the retreading process.

In some embodiments, a mold for molding a tire tread may include a plurality of mold segments. Each of the plurality of mold segments may include an integer number of tread pitch repetitions. The plurality of mold segments may be structured to be coupled to each other end-to-end so as to form the mold such that the mold may include an integer number of tread pitches. The mold also includes at least one mold end segment positioned on at least one end of the mold and has a mold end segment length shorter than a length of each of the plurality of mold segments.

In some embodiments, a curing press for forming a tire tread may include a top press block, a bottom press block and at least one mold assembly positioned between the top press block and the bottom press block. The at least one mold assembly may include a platen and a mold. The mold may include a plurality of mold segments. Each of the plurality of mold segments may include an integer number of tread pitch repetitions. The plurality of mold segments may be structured to be coupled to each other end-to-end so as to form the mold such that the mold may include an integer number of tread pitches. The mold also includes at least one mold end segment positioned on at least one end of the mold and has a mold end segment length shorter than a length of each of the plurality of mold segments.

In some embodiments, a method of forming a tire tread may include assembling a plurality of mold segments end-to-end so as to form an elongate structure. An end segment piece may be added to a first end of the elongate structure. The plurality of mold segments and the end segment piece may be attached so as to form a unitary mold. The mold may be used in a pressing operation to form a tire tread.

All combinations of the foregoing concepts and additional concepts discussed in greater detail below (provided such concepts are not mutually inconsistent) are contemplated as being included within this disclosure. In particular, all combinations of claimed subject matter appearing at the end of this disclosure are contemplated as being included within this disclosure.

BRIEF DESCRIPTION OF THE DRAWINGS

The foregoing and other features will become more fully apparent from the following description and appended claims, taken in conjunction with the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the disclosure. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Some embodiments relate to methods and apparatuses for making retreaded tires and, more particularly, to an apparatus and method in which preformed treads may be consistently cut in a location relative to the tread pattern that provide for improved splicing while providing a durable splice across varying retreading conditions and reducing scrap in the retreading process.

Figure 1:
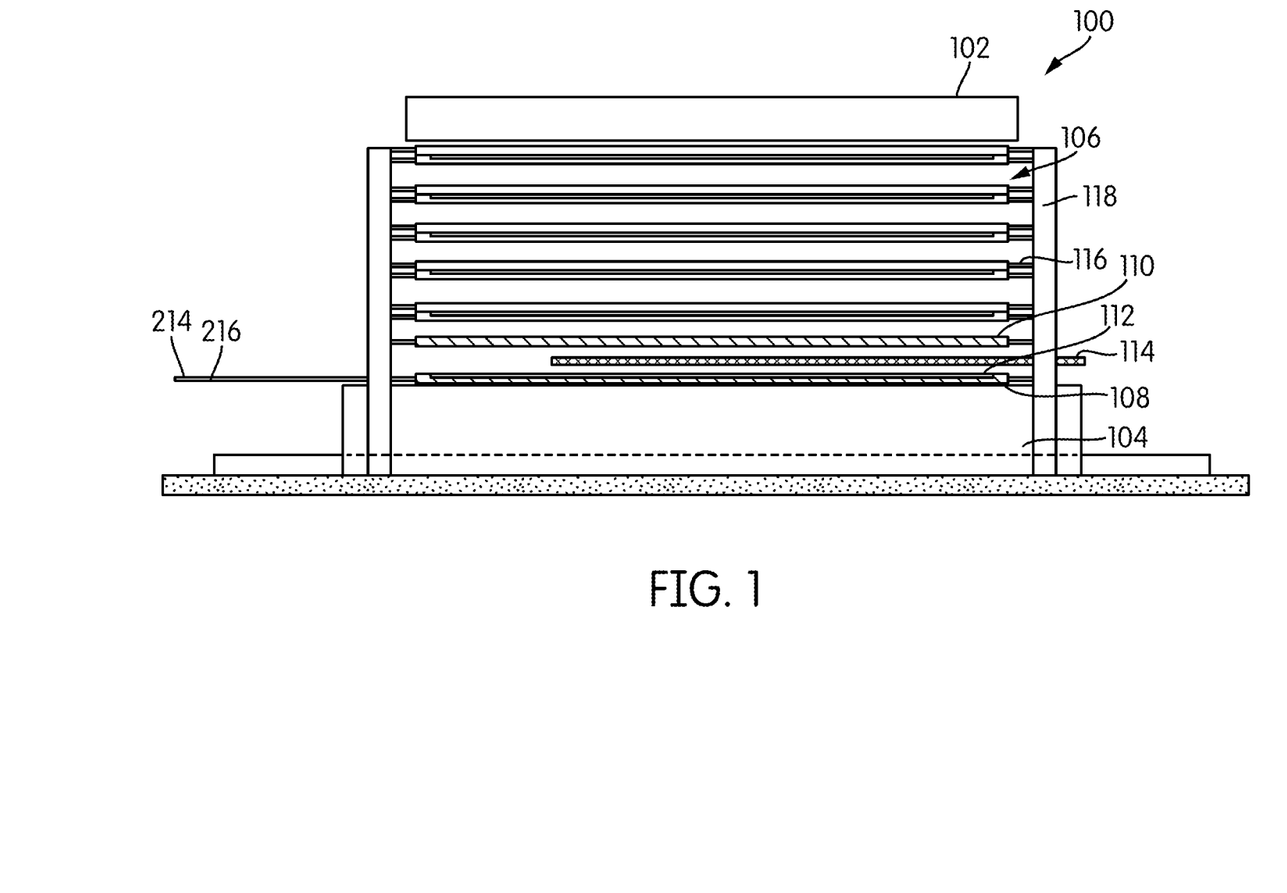
FIG. 1 is a partial view of a curing press in accordance with an embodiment.

A curing press 100 from a side perspective is partially shown in FIG. 1. The curing press 100 may be part of a larger tread forming operation that includes, for example, a composite preform building apparatus, a forming press, and other structures (not pictured). The curing press 100 may include top press blocks 102 and bottom press blocks 104. Between the top press blocks 102 and the bottom press blocks 104 are positioned a plurality of mold assemblies 106 that each include two parts that come together to define an internal molding cavity. In the illustration of FIG. 1, a mold 108 and a platen 110 make up the mold assembly 106, but other configurations may be used. For example, what is referred to relative to FIG. 1 as a mold 108 may be positioned in an inverted orientation in the curing press 100 such that a mold cavity 112 is facing down. In such an embodiment, the platen 110 would be positioned below the mold 108 such that it fits over the mold cavity 112. In the description that follows, a particular orientation having the mold 108 located beneath the platen 110 is discussed for illustration, but it should be appreciated that the relative orientation of these two elements may be in other orientations. Moreover, although six mold assemblies 106 are shown, a single assembly or a different number of mold assemblies may be used. Each mold 108 forms a mold cavity 112 into which a preform may be packed or loaded. Following the application of pressure and heat to the closed mold assembly 106, a vulcanized tread 114 can emerge. In other alternatives, the press may be configured to provide continuous manufacture of the molded article or a tread in belt or other form.

The curing press 100 further includes linkages 116 that connect the parts of each mold assembly 106 to frame members or posts 118, which include mechanisms (not shown) that can selectively move the various parts of each mold assembly 106 vertically to enable the loading of preforms and the unloading of finished treads from each mold assembly 106. In a forming process for a tread 114, a tread preform, which may be built by successively stacking layers of rubber with other materials such as thread, fabric, steel belts, wire mesh and the like, is loaded into a mold 108.

Each mold 108 may have ridges and depressions formed therein structured to shape and mold the lugs and sipes of a desired pattern in the emerging tread 114. The platen 110 may be placed in an opposed relationship to the mold cavity 112 and a curing process may ensue that vulcanizes the preform into the tread 114. The tread may thereafter be detached and removed from the mold 108.

Figure 2:
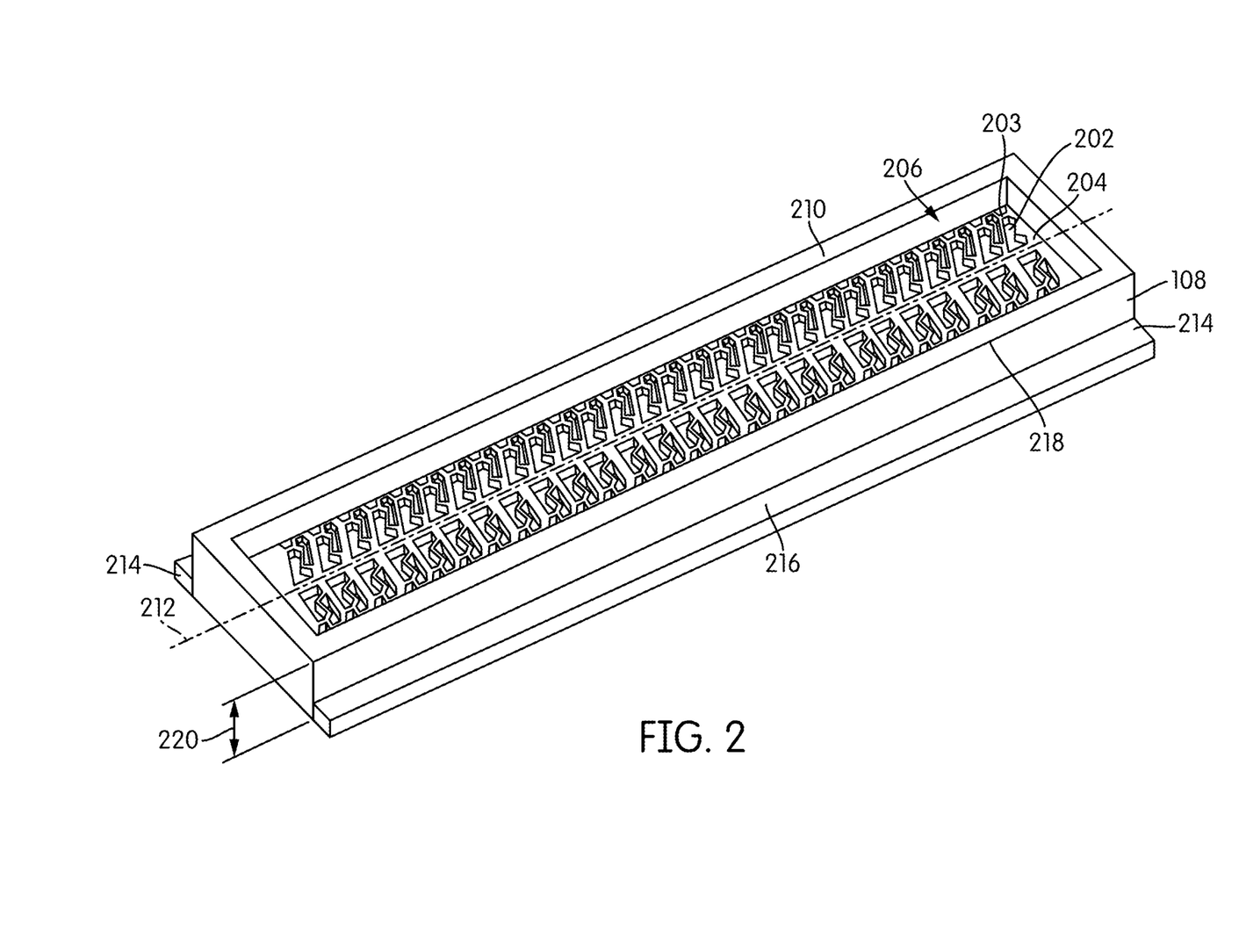
FIG. 2 is an outline view of a curing mold in accordance with an embodiment.

When forming the tread 114, the mold 108 imprints onto the preform a predetermined pattern of lugs and/or ribs. In reference to FIG. 2, these lugs may be formed as depressions 202 in a bottom surface 204 of the mold 108, which may be separated by sipe blades or ridges 203. The mold 108 may form an internal cavity 206 that is open from the top and surrounded by the bottom surface 204 and walls 210 that extend around the perimeter of the cavity 206. Although a mold 108 configured to form a single tread strip is shown, the mold 108 may include two or more additional cavities extending parallel to one another and configured to form two or more tread strips from a single preform. In the illustrated embodiment, the single-cavity mold 108 has a generally elongate rectangular shape that extends along an axis 212. The mold 108 may further include two tracks or ledges 214 extending along its sides, generally parallel to the axis 212. Each ledge 214 may be disposed on a side of the mold 108 and may include a track 216 that extends generally parallel to a top edge 218 of the side portion of the wall 210 at an offset vertical distance 220 therefrom. Although the ledges 214 are shown to have a length that is about equal to the overall length of the mold 108 in FIG. 2, the ledges 214 can extend past the ends of the mold 108, as shown in FIG. 1.

Figure 3:
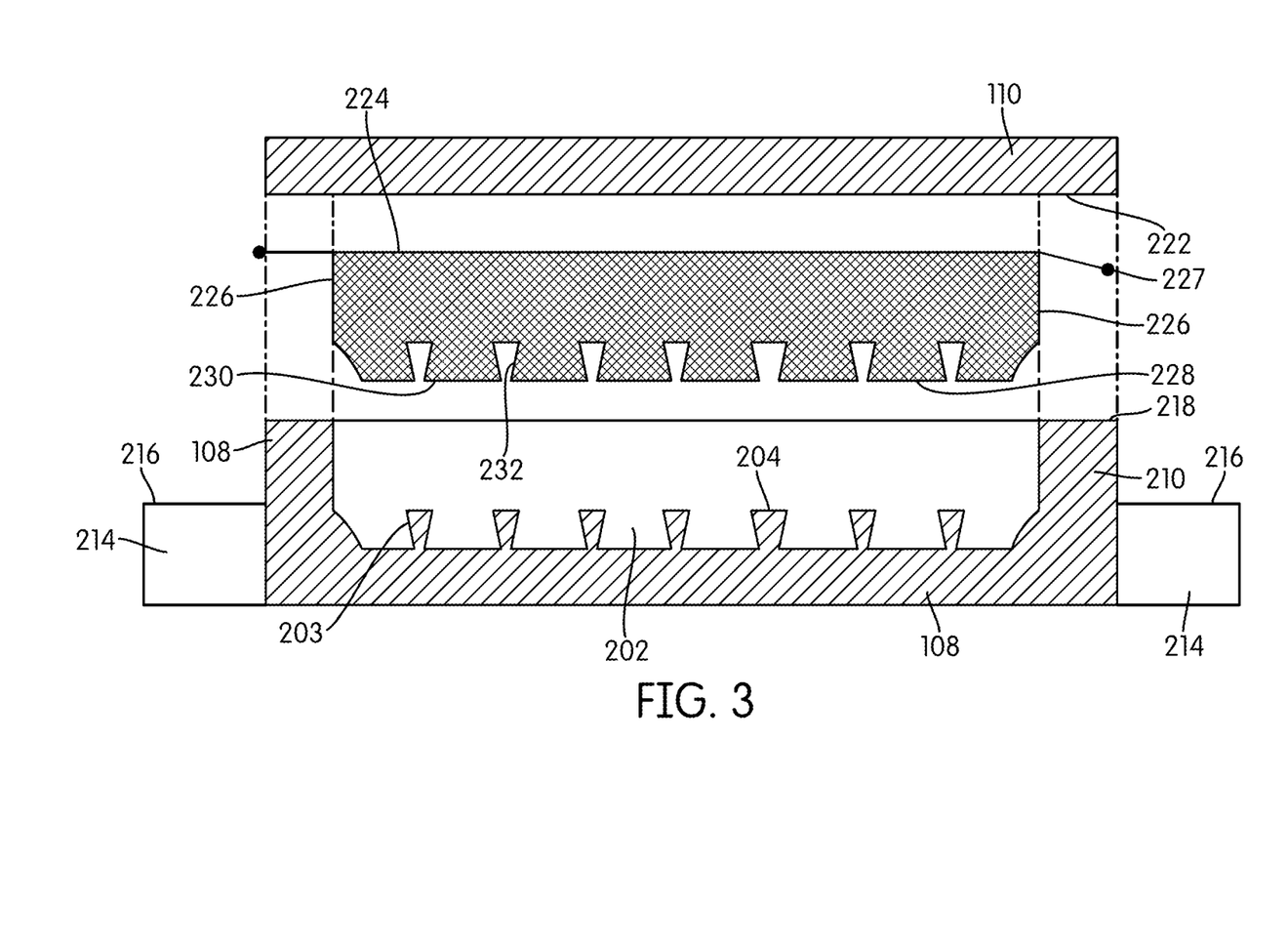
FIG. 3 is a cross section of a curing mold and a finished tread in accordance with an embodiment.

A cross section of the mold assembly 106 during a molding operation phase is shown in FIG. 3. In this illustration, the mold assembly 106 is shown opened following a molding and curing operation for the tread 114. The top mold or platen 110 may include a bottom surface 222 that forms the top or inner surface 224 of the tread 114. The lateral surfaces 226 and the outer or tread surface 228 of the tread 114 are formed, respectively, by the side walls 210 and bottom surface 204 of the mold 108. Flash 227 may remain on the tread 114 along the interface between the platen 110 and the mold 108. A plurality of lugs 230 may be arranged along the tread surface 228 and are formed by the corresponding lug depressions 202.

As may be seen in the cross section of FIG. 3, certain tread patterns may include small or even negative draft angles formed in the surfaces around the sides of the lugs 230. Draft angle denotes the resulting angle formed by mold surfaces relative to the direction of removal of the molded article from the mold. Accordingly, positive draft angles are disposed such that the removal of the molded article is facilitated, whereas negative draft angles are disposed such that at least some deformation of the molded article is required to remove it from the mold. In the cross section of FIG. 3, the lugs 230 may have negative draft angles on their side surfaces 232, which have been exaggerated for the sake of illustration. As can be appreciated, certain portions of the lugs may have to elastically deform when removing the tread 114 from the mold 108.

Figure 4:
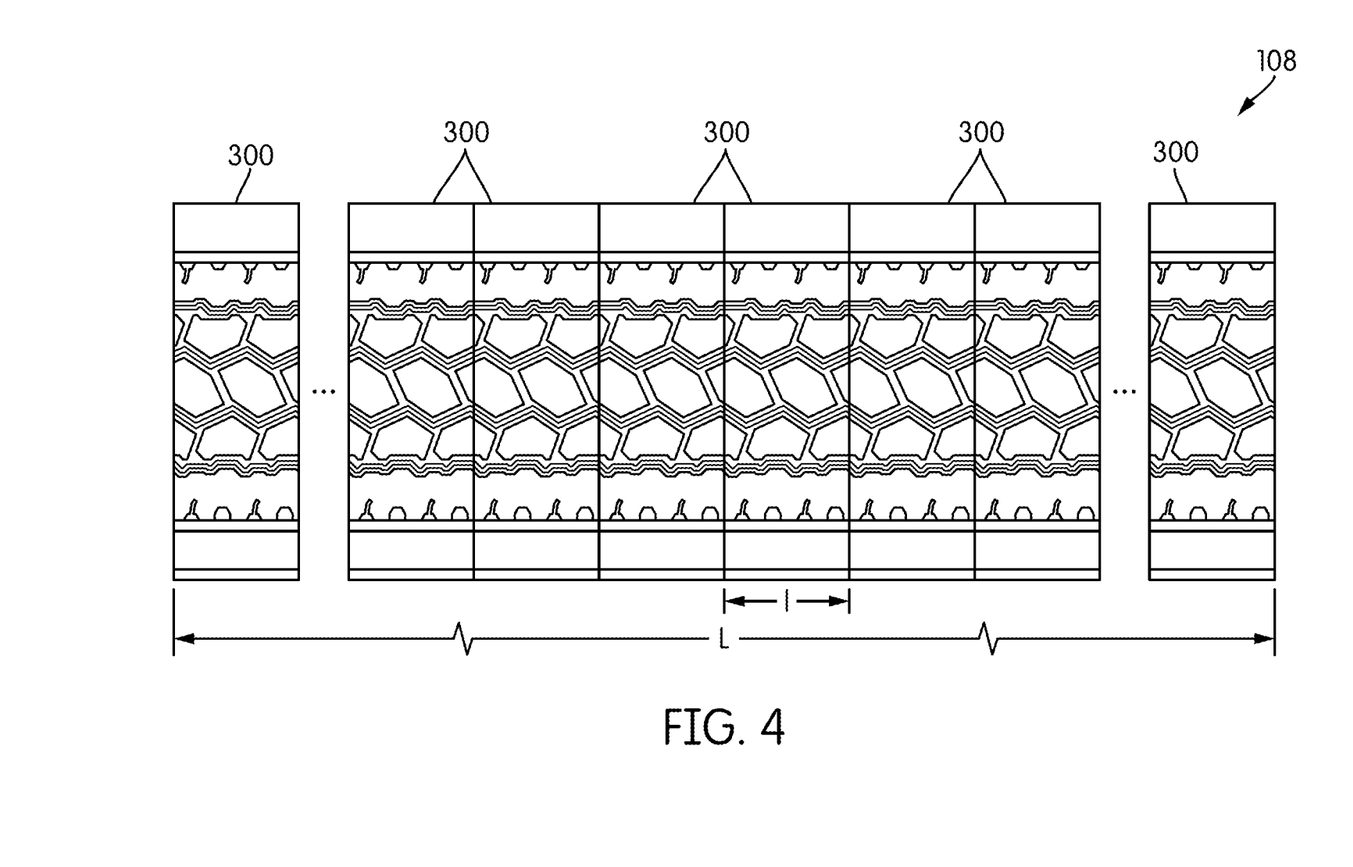
FIG. 4 is a segmented mold tray in accordance with the disclosure.

In one embodiment in accordance with the disclosure, the mold 108 may be made by assembling a plurality of mold segments 300, as shown in FIG. 4. Each segment 300 may extend over a predetermined length, l, such that the total length of the mold 108, L, which may be made up from n mold segments 300 can be calculated as L=n*l. It should be appreciated that the mold segments 300 are either directly connected to one another or can be, alternatively, placed on an elongate tray (not shown), for example a mold tray, and secured thereon, threaded on an elongate beam (not shown), or the like, to form the mold 108. In the illustrated embodiment, each of the mold segments 300 includes a whole number or, stated differently, an integer number of tread pitch repetitions, which may be cut in locations within the tread pitch but which, when the mold segment is viewed in its entirety, form an integer number of tread pitches. For example, each of the mold segments 300 shown in FIG. 4 forms two whole tread pitches. In this way, when the mold segments 300 are assembled together into the mold 108, the mold 108 includes an integer number of tread pitches. It is noted that the pitch spacing may change or be varied along the length of the mold 108 for noise attenuation reasons, but the number of pitches per mold segments may be maintained at a whole number at more or fewer than the two that are shown here.

Figure 6:
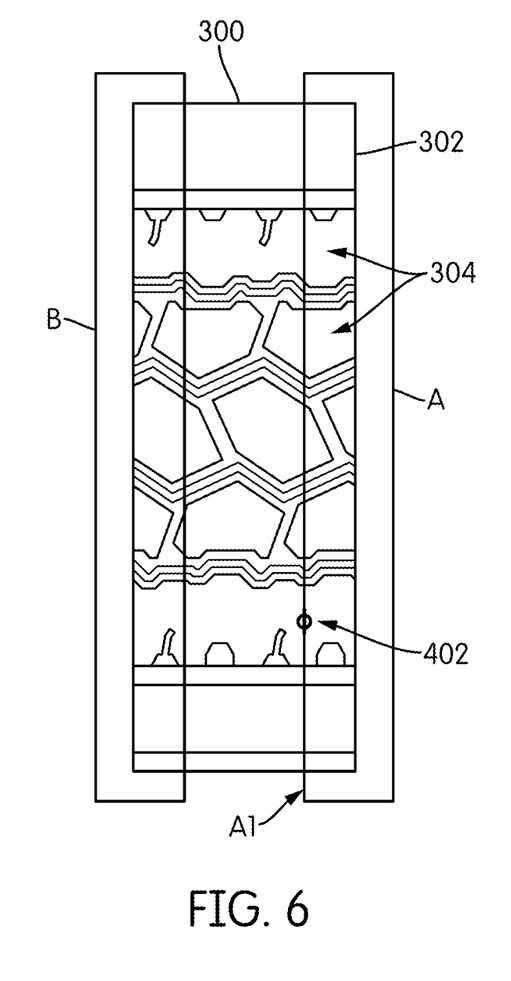
FIG. 6 is a middle piece for a mold in accordance with the disclosure.

In reference now to FIG. 6, each mold segment 300 may include a body portion 302 into which various depressions 304 may be formed. The depressions 304 imprint onto a preform to form the various features of the tread 114, as described above. In the illustrated embodiment, each segment 300 may form two complete sets of lugs or, stated differently, two complete tread pitches. Selecting an appropriate length for each mold segment 300 may depend on a number of factors including the length of the final tread 114, desired variations in pitch length along the tread band, if any, size of the tread, and others. For example, the mold segments 300 may range in length between 1 and 6 inches (about 2.5 to 15 cm), but other lengths may be used. Other design options for selecting a desirable tread section may include avoiding creating thin features between the segments, which may not form properly, preferring features that allow proper alignment of the segments, for example, to avoid placing the segments backwards in the mold, and other features aimed at optimizing the design and structure of the mold segments of the mold assembly.

In some instances, the tread rolls resulting from a tire tread molding operation may be cut at an end of the roll, for example to remove contamination and to present a maximum surface area that may be suitable for splicing two cut ends of the roll around a tire carcass during a retreading process. In some instances, the initial cut may remove several inches of the tread, because, for example, the mold segment interfaces and, specifically, the leading end or trailing end of the roll formed by the last mold segment used to make the mold, may not be optimized for presenting a location of an end cut to the roll for a suitable or desirable face for tread splicing. That is, because tread rolls and/or tire treads may be damaged during transport and/or have contamination on an initial or final end, a tread portion may need to be removed to eliminate the damage and/or contamination and to produce a tire tread cut-end conducive to splicing. Thus, the rather lengthy initial cut from each tread roll may generate increased waste material and cost for tire retreading operators. By providing a modified initial and/or end segment different from the mold segments 300, the amount of tread portion to be removed to produce a suitable or desirable face for tread splicing may be reduced.

In some embodiments, the leading edge of a pre-cured tread roll, e.g., either or both ends of the tread 114, may be optimized to reduce waste, such as by allowing a shorter cut to be made. In some embodiments, the length of tread that may be cut during an initial cut of a new roll that may be minimized by adjusting a mold end segment, such as the mold end segment 308 of FIG. 5 or the mold end segment 306 of FIG. 7, to result in a tread end requiring a smaller or reduced section of tread to be removed. For illustration, where previous designs that utilize only the same mold segments 300 may have necessitated a tread length of several inches to be removed to permit removal of the contamination and/or damage while also providing a suitable face for tread splicing, providing one or more modified mold end-segments 306, 308 in accordance with the present disclosure provides for removal of a smaller portion of the end of the tire tread and/or roll to produce a tire tread cut-end conducive to splicing while also reducing the amount of removed tire tread. For instance, the reduced portion of tread removed may be reduced from several inches to a length of tread on the order of 0.125 to 0.25 inches. In the illustrated embodiment of FIG. 6, about 0.5 inches may be removed from the mold segment 300 to create the mold end-segment 308 and/or the mold end-segment 306. Further, the tread end presented by the mold end-segment 306, 308 in accordance with the present disclosure may form a tread having a leading tread edge that is conducive to splicing while permitting a reduced portion of the tire tread and/or roll to be removed to account for any damage and/or contamination. Relative to the present disclosure, a tread cross section that is conducive to splicing may be one that can fulfill any number of factors and performance attributes including a maximization of contact area on the leading face of the cut tread that may mate with a corresponding face on the opposite side of the tread during a splice operation as the tread is wrapped and secured around a tire carcass that is being retreaded. In some embodiments, the mold end-segment may be have a modified shape or include features conducive to splicing in addition to in addition to, or instead of being shorter in length to the mold segments 300. For example, the mold end-segment may be cut in a particular pattern (e.g., a zig-zag pattern, a jagged pattern, have an under or over cut, etc.) structured to mate with a corresponding pattern on the opposite end of the tread so as to facilitate splicing.

Figure 5:
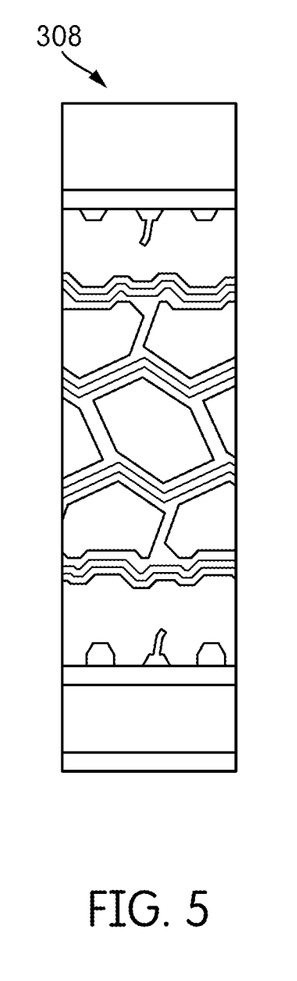
FIG. 5 is a mold end-piece in accordance with the disclosure.
Figure 7:
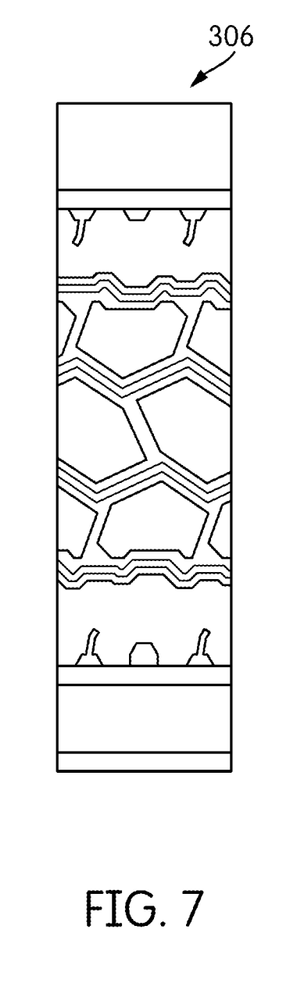
FIG. 7 is a mold end-piece in accordance with the disclosure.

In the illustrated embodiment of FIG. 6, the mold segment 300 may include one or two areas that can be removed to create end-segments having the characteristics described herein, i.e., end-segments having a length that may have been optimized to create a favorable or desirable tread strip having end-features that are conducive to reducing waste while providing ends that are suitable for tread splicing after removing a portion of the tread end without removing excessive material. Two such areas are shown on the mold segment 300 in FIG. 6 and are denoted by rectangular areas A and B. Specifically, a mold segment 300 may be modified to create a first end-segment 306, as shown in FIG. 7, by removing material from the body portion along rectangle A, and a second end-segment 308 may be formed, as shown in FIG. 5, by removing material from the body portion along rectangle B. It is noted that each of the rectangles A and B encompasses about ½ of a tread pitch such that both end-segments together remove about a full tread pitch.

Figure 8:
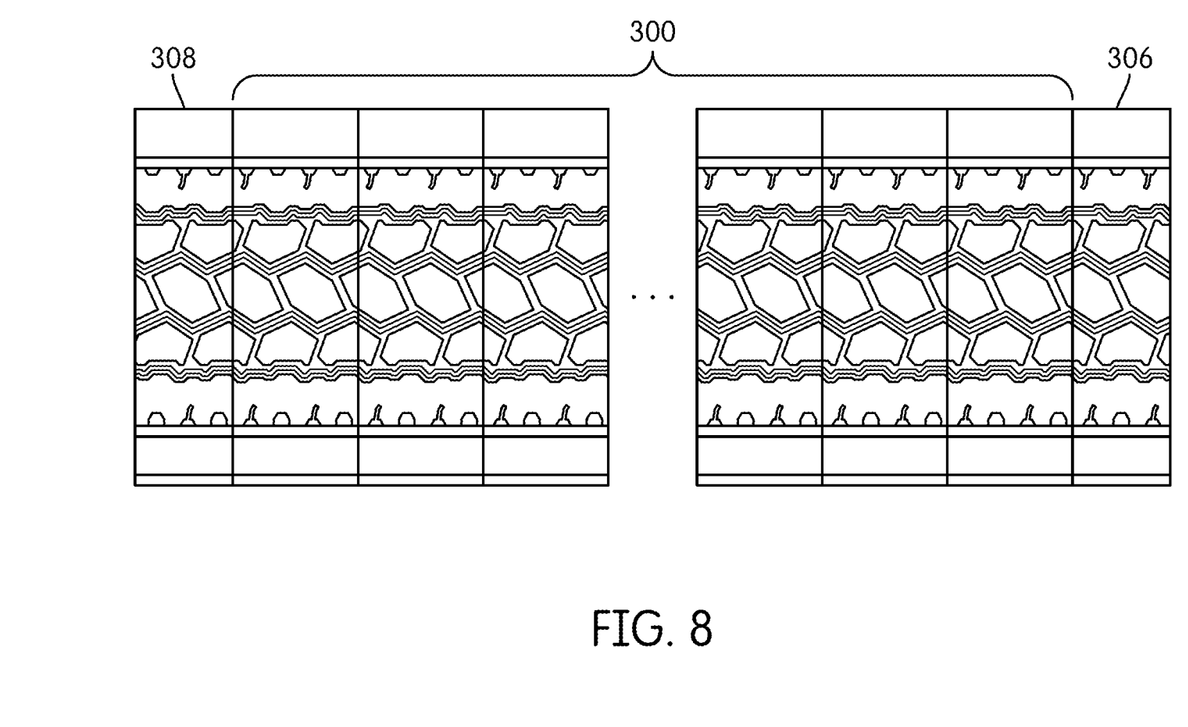
FIG. 8 is a segmented mold tray in accordance with the disclosure.

When assembling a mold, for example, the mold 108 (FIG. 2), a number of mold segments 300 may be strung along a single row such that they matingly engage one another. The number of segments that may be used depends on the length of each segment and the desired length of the tread being formed, which may suffice for retreading two or more tires. At either end of the string of mold segments 300 used to create the mold, an end-segment 306 or 308 may be placed. Such an arrangement is shown in FIG. 8, where a plurality of mold segments 300 are arranged in a row along a middle portion of a mold construction, and where a first end-segment 306 is placed at one end of the mold set. As shown, a second end-segment 308 is placed on an opposite end of the set of mold sections. The second end-segment is optional.

Referring now again to FIGS. 5-7, the rectangular area A, which may be removed to form the first end-segment 306 (FIG. 7), may intersect the body portion of the regular mold segments 300 along a line, Al, which extends perpendicularly relative to a long dimension of the mold segment 300 in a direction of the tread. The line Al extends through portions of the outer and inner lugs of the tread that are proximate to areas of the tread pattern having a maximum cross section, which may be removed before use to provide a cut end of the tread that may be conducive to splicing. To identify the line Al, along which the initial cut is made, cut-marks 402 may be etched into the mold segments 300 at appropriate spots. Enlarged views of the cut marks 402 are shown in FIGS. 10 and 11.

Figure 10:
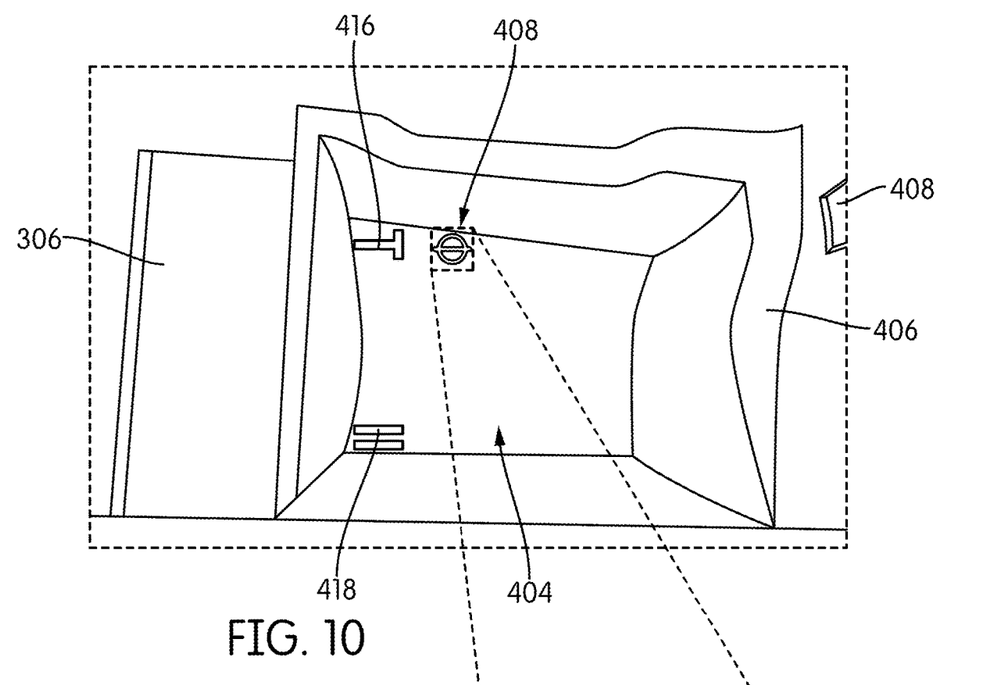
FIG. 10 is a partial, enlarged view of a mold end-piece in accordance with the disclosure.
Figure 11:
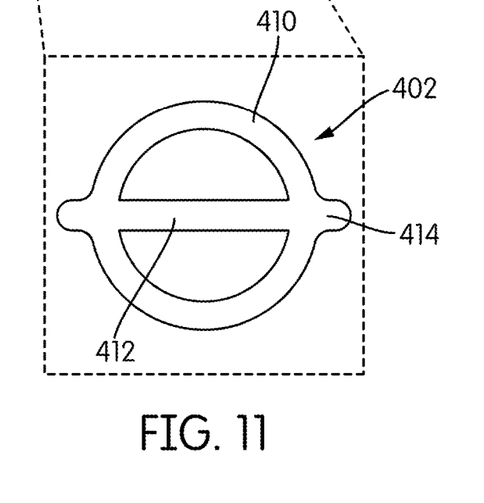
FIG. 11 is a detail view of an end-mark in accordance with the disclosure.

In reference to FIG. 10, an enlarged portion of an end-segment 306 is shown. The end-mold or first end-segment 306 may form a depression 404 that develops a lug 230 (FIG. 3) in the finished tread. The depression 404 may be closed on one end to contain the formed tread as the depression 404 may be disposed at one end of the tread. Walls 406 may surround the depression 404 so as to form the channels between the lugs, and shorter walls 408 may form depressions within the respective lug. The cut-mark 402 may be formed in a bottom wall of the depression 404, such that it may create a corresponding tread cut-mark on a bottom of the resulting tread that protrudes outwardly from a tread plane. The cut-mark 402 may take on any appropriate shape that denotes a desired tread end-cut location in the finished tread. For example, as shown in the enlarged detail of FIG. 11, the cut-mark may include a circle 410 that is bifurcated by a line 412 extending diametrically across the circle 410. End portions 414 of the line 412 may extend past the end of the circle 410 such that the entire cut-mark 402 has a shape resembling the capital Greek letter "phi" (Ø). During use, the resulting tread may be cut along the line 412 to expose a first end of the tread. The diameter of the circle 410 is also configured to represent an acceptable cutting region along which the tread may be cut. As an also be seen from FIG. 10, additional marks 416 and 418 may be included in the finished tread that denote possible cut locations, as is more fully described in U.S. Pat. No. 8,820,375, which is incorporated herein by reference in it's entirety.

In general, a typical retreading process or operation involves buffing an existing tread from a tire to form a carcass, applying a cushion gum of uncured rubber around the buffed carcass to act as a glue, wrapping a strip of pre-cured tread around the gum, stitching the ends of the tread together, and then heat-treating the assembly to produce a tire. These operations may be automatic, manual, or semi-automatic, and may further include placing cushion gum between the faces being stitched together.

Figure 9:
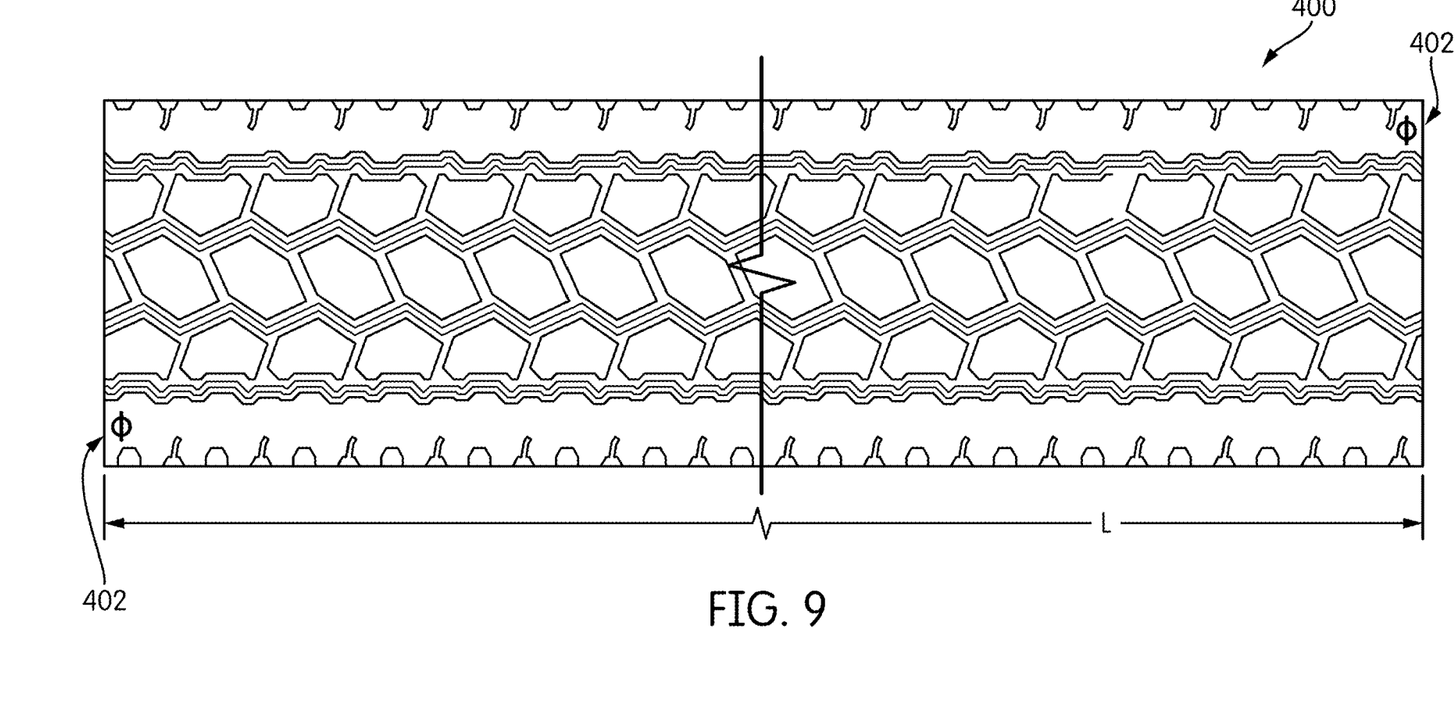
FIG. 9 is a pre-cured tread strip in accordance with the disclosure.

In one aspect, therefore, the present disclosure is directed to a tread that is made from a mold having a plurality of mold segments that make up a central portion of the mold, and having a different mold section making up at least one end of the mold, i.e., having a different end-segment. Such a tread 400 is shown if FIG. 9. It is noted that a length, L, of the tread 400 may correspond to the length, L, of the mold 108 used to make the tread 400 (see FIG. 4), less some fraction of or a full tread pitch due to the use of end-segments, for example, end-segments 306 and 308 (see FIGS. 5 and 7) that may be used to assemble the mold. When both end-segments are used to remove about a full thread pitch, waste in using the tread 400 is further reduced. The tread 400 includes cut-marks 402 on either end. In some embodiments, only one side may be used to cut the tread 400.

Figure 12:
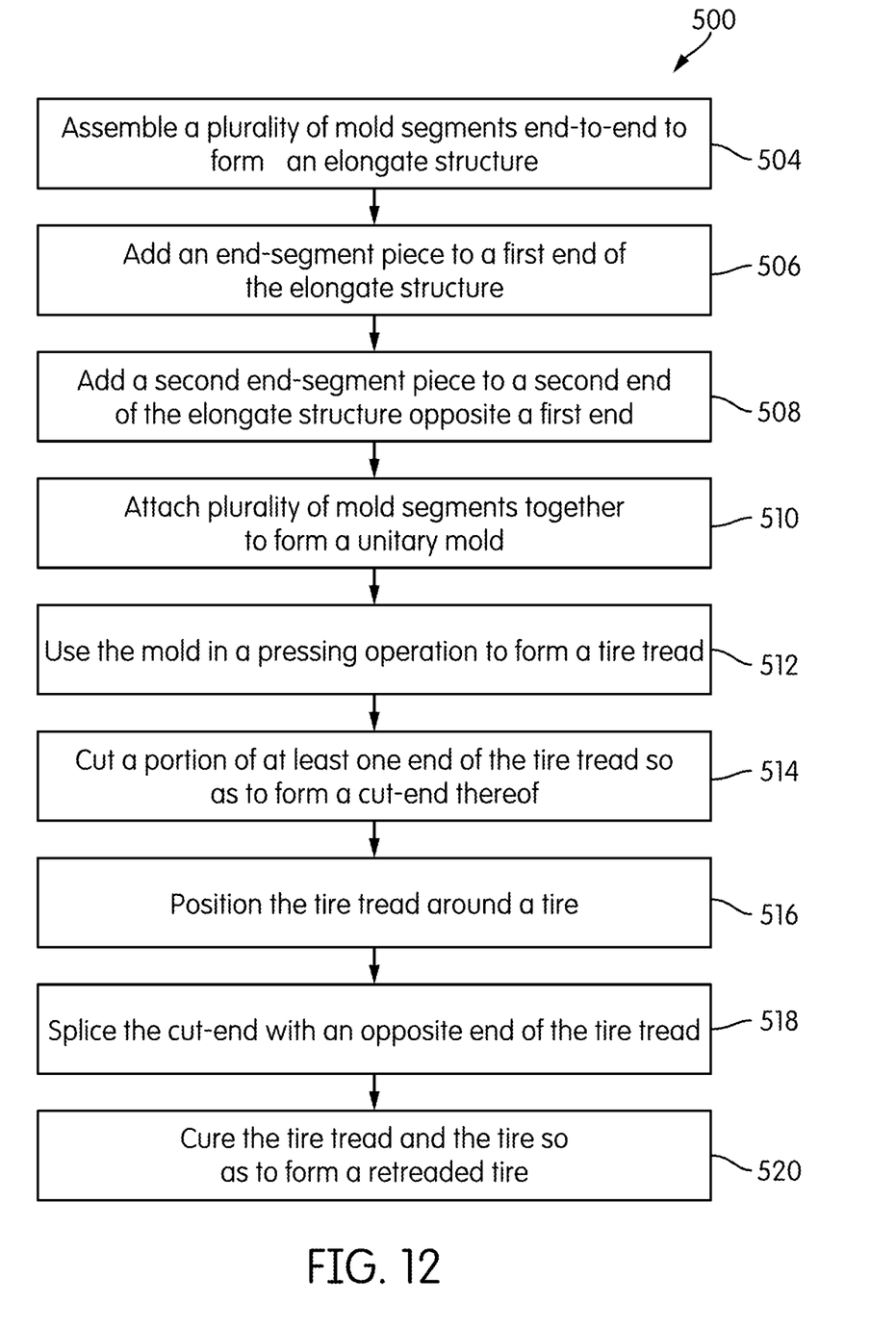
FIG. 12 is a flowchart for a method of assembling a mold in accordance with the disclosure.

A flowchart for a method 500 of assembling a mold in accordance with the disclosure is shown in FIG. 12. The method 500 includes assembling a plurality of mold segments end-to-end to form an elongate structure at 504, which elongate structure constitutes an elongate mold into which a tread strip may be formed. As discussed above, the total length of the mold will depend on the total length of the various mold segments that are assembled end to end. Moreover, even though the various mold segments can have different individual lengths, the tread pitch count included in each mold section will be the same as the remaining mold segments.

An end-segment piece may be added to an end of the elongate structure at 506 as a termination piece to complete one end of the mold. The end-segment may have shorter length and/or a different number of pitch count than each of the mold segments that make up the middle portion of the mold. Optionally, a second end-segment may be added to the other end of the elongate mold structure at 508. In some embodiments, the plurality of mold segments and the end segment piece may be positioned on a mold tray. The plurality of mold segments and the end segment piece may be secured to the mold tray.

The various mold sections including the first end-segment piece and, optionally, the second end-segment piece, may be releasably or permanently attached together at 510 so as to form a unitary mold. The attachment between the various mold pieces may be accomplished directly, for example, by connecting one mold segment to its adjacent segments in the elongate structure, or indirectly, for example, by attaching each mold piece to a holder, rail or other structure that holds the various segments together. Moreover, connection of the mold segments can be releasable or breakable, for example, by using fasteners, or permanent, for example, by welding the various segments together or to the supporting structure. The mold may then be used in a pressing operation to form a tire tread at 512.

In some embodiments, a portion of at least one end of the tire tread is cut at 514 so as to form a cut-end thereof. For example, the at least one end of the tire tread may be cut proximate to a tread cut-mark defined on the tire tread, as described herein. The cut tire tread may be positioned around a tire at 516, for example positioned around an outer circumference of a buffed tire. An adhesive such as curing gum or any other adhesive may be disposed on the outer circumference so as to cause the tire tread to adhere to the outer circumference of the buffed tire.

The cut-end of the tire tread may be spliced with an opposite end of the tire tread at 518. For example, the cut-end of the tire tread may be fused or stitched together with the opposite end of the tire tread. The tread pattern at the cut-end of the tire tread may substantially align with the tread patter on the opposite end of the tire tread. The tire tread and the tire may be cured at 520 so as to form a retreaded tire.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as being absolute on a scale but should only indicate relative improvement, nothing should be construed as indicating any non-claimed element as essential to the practice of the invention.

It should be noted that the term "example" as used herein to describe some embodiments is intended to indicate that some embodiments are possible examples, representations, and/or illustrations of possible embodiments (and such term is not intended to connote that some embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While this specification contains many specific implementation details, these should not be construed as limitations on the scope of this disclosure or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:

1. A method of forming a tire tread, comprising:
providing a plurality of mold segments that includes a first mold segment and subsequent mold segments, the first mold segment defining a first number of tread pitch repetitions,
assembling the subsequent mold segments end-to-end so as to form an elongate structure;
removing material from the first mold segment to form the first end segment, the first end segment having less than the first number of tread pitch repetitions, the first end segment further having a cut-mark that defines a circle and a line bifurcating the circle, wherein the cut mark is etched into the first end segment;
adding the first end segment to a first end of the elongate structure;
attaching the plurality of mold segments and the first end segment so as to form a unitary mold;
using the unitary mold in a pressing operation to form a tire tread such that the tire tread includes a tread cut-mark corresponding with the cut-mark of the first end segment.

2. The method of claim 1, further comprising:
adding a second end segment to a second end of the elongate structure opposite the first end.

3. The method of claim 1, further comprising:
positioning the plurality of mold segments and the first end segment on a mold tray; and
securing the plurality of mold segments and the first end segment to the mold tray.

4. The method of claim 1, further comprising:
cutting a portion of at least one end of the tire tread so as to form a cut-end of the tire tread;
positioning the tire tread around a tire;
splicing the cut-end of the tire tread with an opposite end of the tire tread; and
curing the tire tread and the tire so as to form a retreaded tire.

5. The method of claim 4, wherein the cutting removes half of a tread pitch from the at least one end of the tire.

6. The method of claim 1, wherein the first number of tread pitch repetitions is an integer, and the first end segment includes a non-integer number of tread pitch repetitions.

7. The method of claim 1, further comprising cutting the tire tread along the tread cut-mark.

8. The method of claim 1, wherein the line has two end portions each extending past an outer diameter of the circle.

9. The method of claim 1, wherein the first end segment is shorter in length in a direction of the mold length than a length in the direction of the mold length of each of the subsequent segments.

* * * * *